Aug. 3, 1948.                    W. E. PFEFFER                    2,446,431
                        ELECTRICAL MEASURING INSTRUMENT
Filed Jan. 29, 1945                                          2 Sheets-Sheet 1
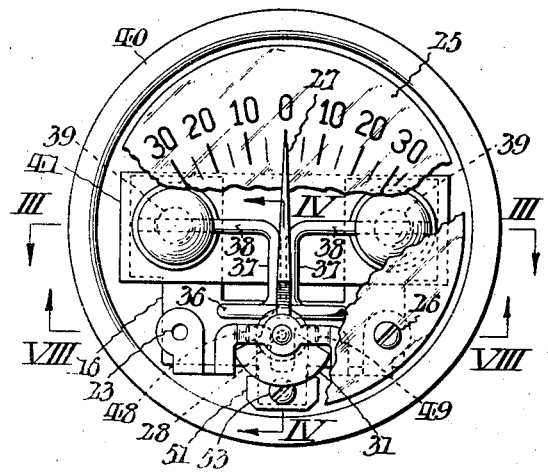
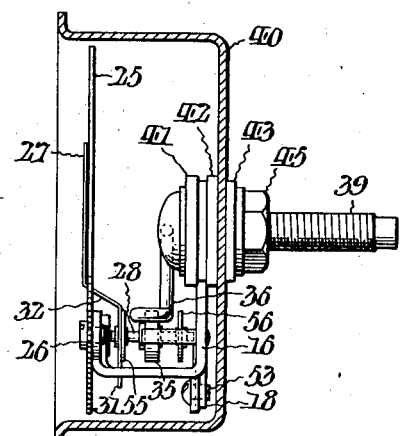
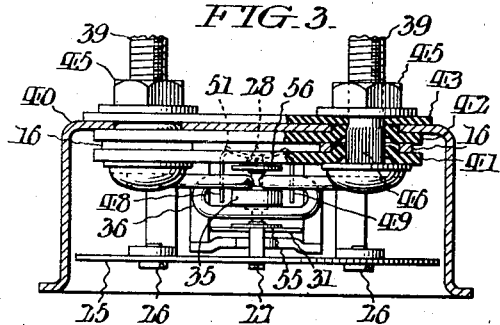
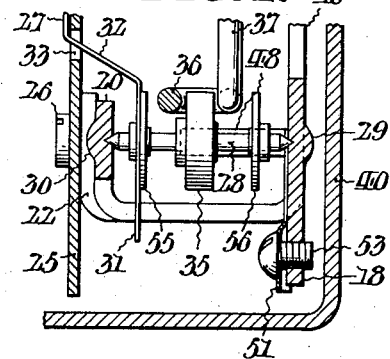
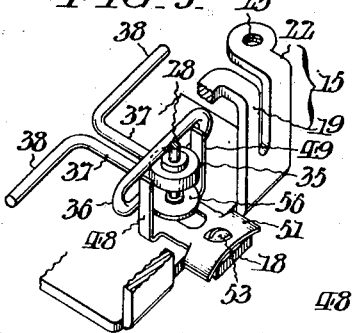
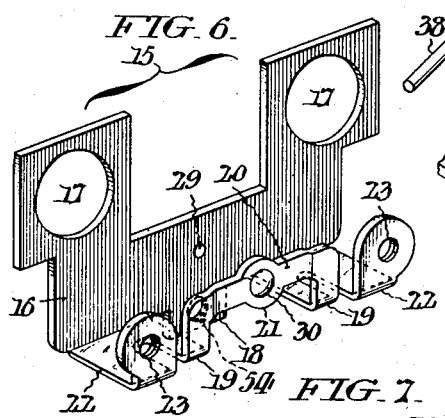
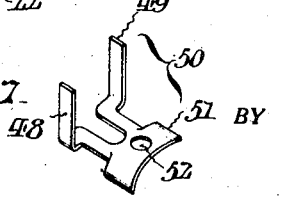
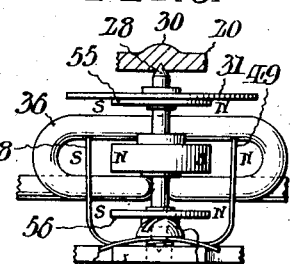
INVENTOR:
William E. Pfeffer,
BY Paul & Paul
ATTORNEYS.

Aug. 3, 1948.    W. E. PFEFFER    2,446,431
ELECTRICAL MEASURING INSTRUMENT
Filed Jan. 29, 1945    2 Sheets-Sheet 2
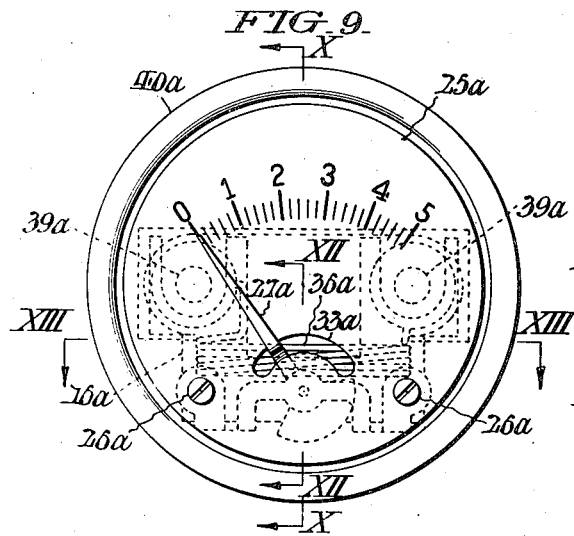
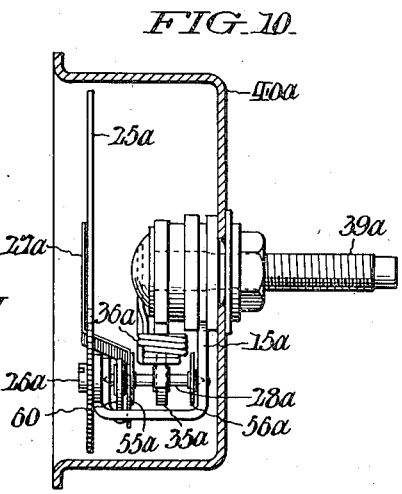
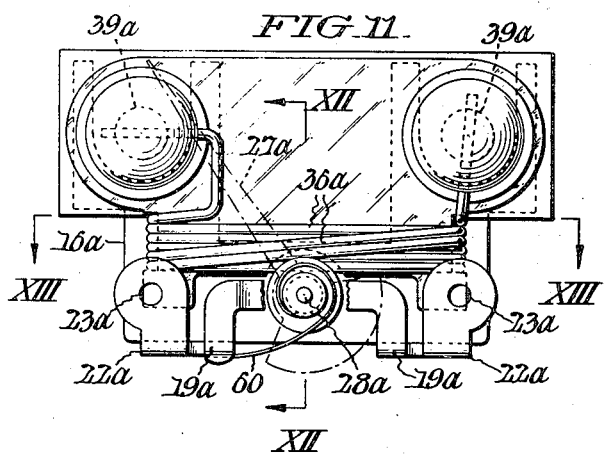
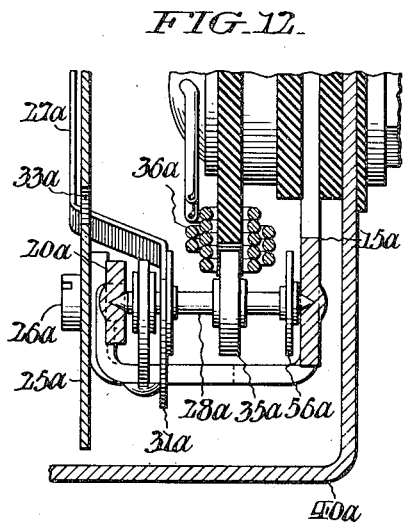
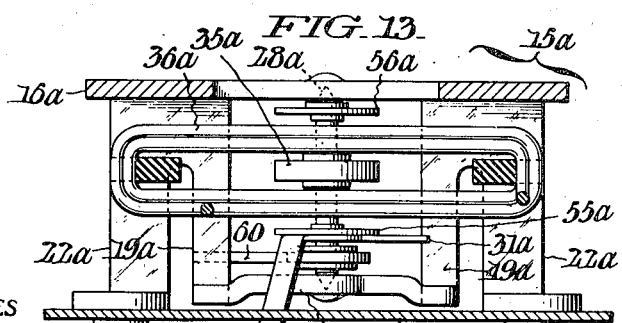
INVENTOR:
William E. Pfeffer,
BY Paul & Paul
ATTORNEYS.

Patented Aug. 3, 1948

2,446,431

UNITED STATES PATENT OFFICE 2,446,431

ELECTRICAL MEASURING INSTRUMENT

William E. Pfeffer, Perkasie, Pa., assignor, by mesne assignments, to Paul Mood, Lester Void, Luther Mood, and William E. Pfeffer, copartners trading under the name of The Electro-Mechanical Instrument Company, Perkasie, Pa.

Application January 29, 1945, Serial No. 574,990

6 Claims. (Cl. 171—95)

This invention relates to electrical measuring instruments such as ammeters, milliammeters and voltmeters, and is concerned more especially with meters of the pluralized vane type.

Amongst the aims of my invention are to attain in instruments of the kind referred to, a high degree of torque and sensitivity comparable to that of meters of the moving coil types.

A further aim of my invention is to secure the above objectives in an electrical measuring instrument which is of rugged construction; which can be depended upon for accuracy and reliability in service over extensive periods of use; which is easily calibrated; and which, moreover, lends itself to economic manufacture in quantity at small cost.

How the foregoing and other objects and attendant advantages are readily realized in practice will appear from the following detailed description of the attached drawings wherein Fig. 1 shows the front view of an ammeter with the lower portion of its dial broken out, conveniently embodying the present improvements, the illustrated instrument being designed for use to indicate the charging or discharging current flow rates of automobile or truck batteries.

Fig. 2 is a side elevation of the meter with its casing shown in axial section.

Fig. 3 is a horizontal sectional view of the meter taken as indicated by the angled arrows III—III in Fig. 1.

Fig. 4 is a fragmentary detail sectional view taken as indicated by the angled arrows IV—IV in Fig. 1 and drawn to a larger scale.

Fig. 5 is a broken-out perspective view showing the frame member by which the moving parts of the meter are supported within the casing.

Fig. 6 is a perspective view of the frame member.

Fig. 7 is a perspective view of an adjustable stationary magnetic element forming a part of my improved meter.

Fig. 8 is a fragmentary sectional view taken as indicated by the angled arrows VIII—VIII in Fig. 1.

Fig. 9 is a view corresponding to Fig. 1 showing an alternative embodiment of my invention.

Fig. 10 is a side elevation of the meter of Fig. 9 with its casing in section, taken as indicated by the angled arrows X—X in Fig. 9.

Fig. 11 is a front view of the modified structure with its dial and casing removed.

Fig. 12 is a fragmentary detail sectional view taken as indicated by the angled arrows XII—XII in Fig. 9; and Fig. 13 is a horizontal sectional view taken as indicated by the angled arrows XIII—XIII in Fig. 9.

With more specific reference first more particularly to the embodiment of my invention illustrated in Figs. 1–8, the numeral 15 comprehensively designates the frame member by which the movable parts of the instrument are supported. In practice, this frame member 15 is preferably fashioned in one piece from non-magnetic sheet metal such as brass for example, to the configuration best shown in Fig. 6, with a U-shaped back portion 16 which has openings 17 at the tops of its upright legs and a pendent lug 18 medially of its horizontal bar. Extending forwardly from the back portion 16 of the frame member 15 at the bottom and disposed in symmetric relation to the transverse mid plane of said frame member are two spaced bracket arms 19 whereof the outer ends are turned up and connected by a cross bar 20 having a circular bearing enlargement 21 at its center. To opposite sides of the bracket arms 19 are disposed supplemental bracket arms 22 whereof the ends are turned up in a plane somewhat forward of that of the cross bar 20, with resultant formation of ears which are tapped as at 23.

The circular dial 25 of the instrument is secured to the frame member 15 by a pair of headed screws 26 of which the shanks engage into the tapped holes 23 of the bracket arms 22 as best seen in Figs. 1 and 2. Coordinative with the dial 25 is an indicating hand or pointer 27 which is secured to an arbor 28 whereof opposite ends are pointed and engage aligned spot indentations 29 and 30 respectively in the back portion 16 of the frame portion 15 and in the bearing enlargement 21 of the cross bar 20, see Figs. 4 and 6. As shown in Figs. 2–4 the pointer 27 is provided with a sectoral counter-balance at 31 and is offset at 32 where it extends from the interior of the instrument through an arcuate clearance slot 33 in the dial 25 to the front of the latter.

Affixed to the arbor 28 substantially at the center is a permanent magnet 35 in the form of a disk of high coercive material capable of retaining its magnetism indefinitely, whereof the upper portion extends into the hollow of a coil 36. In the present instance the coil 36 has but a single loop, and, as shown, is formed from a piece of heavy gauge wire whereof the ends are bent first upwardly as at 37 and then laterally outwardly as at 38 and whereof the extremities are soldered or welded into the head slots of a pair of terminal screws 39, said screws being spaced for passage of their shanks rearwardly with circumferential clearance through the openings 17 in the back portion 16 of the frame member 15. In addition to serving as terminals for connection of the meter to an external circuit which is to be metered, the screws 39 also serve as a means for securing the cap-like housing 40 of the instrument, the rear wall of said housing being therefore provided with suitable openings for passage of the shanks of said screws. Strips 41, 42 and 43 of suitable dielectric material are utilized in the manner best illustrated in Fig. 3 to insulate the frame member 15 and the casing 40 from the terminals of the coil 36. In this connection it is to be noted that the insulation strips 41 and 42 are penetrated by the shanks of the screws 39 and are formed with concentric offsets or embossments, which, as instanced in Fig. 3 project into the openings 17 in said frame member and the registering openings of the casing 40; and moreover that the several parts are held in assembled relation by washer-backed nuts 45 engaging the protruding shank ends of the screws. As further instanced in Fig. 3 the shanks of the screws 39 are roughened or flattened as at 46 where they pass with a force fit through the insulating strips 41 and 42, as a consequence of which said screws are prevented from turning as the nuts 45 are tightened.

Arranged at opposite sides of the arbor magnet are pole extremities 48 and 49 of a stationary permanent magnet element 50, which, as best shown in Figs. 5, 7 and 8, is struck from sheet material (hardened steel), said pole extremities being angularly bent and reaching outwardly and upwardly in complementary relation from an arched base portion 51. It is to be noted that the arched base portion of the magnet element 50 is centrally apertured as at 52 for passage of a shank of a securing screw 53 which engages into a tapped hole 54 (Fig. 6) in the pendent tongue 18 on the back portion 16 of the frame member 15. By means of the screw 53, the pole extremities can be adjusted closer to or further from the arbor magnet 35, depending upon the direction in which the screw is turned. Thus the restoring torque set up by the arbor magnet 35 in reacting with the pole extremities of stationary magnet 50 which is yieldingly resistive to the turning of the arbor by the coil flux, can be regulated to suit the turning movement produced by the coil for the purpose of calibrating the instrument.

Also provided on the arbor 28 in accordance with my invention are two relatively thin polarized vanes 55 and 56 which may be either of soft iron or of hardened magnet steel and which are disposed at equal distances from the magnet disk 35 so as to be symmetrically positioned beyond opposite sides of the coil 36 closely adjacent thereto. Due to the described allocation of these vanes 55 and 56 it will be seen that the arbor magnet 35 will induce opposite magnetic poles in them which are relied upon to react upon that portion of the flux of the coil 36 which passes around the outside of the latter and which is not ordinarily used in polarized vane instruments as heretofore constructed. The arbor magnet 35 also induces poles in the hardened adjustable pole extremities 48 and 49 of the permanent magnet 50 so that better control of the arbor is had over a longer scale. Because of its being of high coercive material the arbor magnet 35 will retain its magnetism and since it induces magnetic poles in the other parts above mentioned, these parts will also effectively retain their magnetism. Since the magnetism of stationary magnet 50 is to a certain extent governed by the strength of arbor magnet 35, variations in the strength of the latter will cause corresponding variations in the resistive torque set up between these two magnetic elements. Moreover, since the degree of turning torque set up between the coil 36 and the arbor magnet 35 depends partly upon the strength of said magnet, it will be apparent that as the latter is weakened slightly, the turning effort with respect to the coil flux is likewise weakened slightly. This condition is, however, compensated for to a great extent because the yieldingly resistive restoring torque between arbor magnet 35 and stationary magnet 50 has also been decreased. My improved instrument is thus extremely sensitive and produces a high torque heretofore not available either in polarized vane or moving coil instruments.

The operation of the meter is as follows: when no current flows through the coil 36 the pointer is held in the central or zero position in which it is shown in Fig. 1 by the attraction between the arbor magnet 35 and the pole extremities 48 and 49 of the magnet. On the other hand, when current flows through the coil 36 the field of the coil in reacting with the arbor magnet 35 and the polarized vanes 55 and 56 will cause movement of the pointer 27 in one direction or the other across the dial 25 depending upon direction of the current, the strength of the coil field and the strength of the field between said magnet and the pole extremities 48 and 49 of the stationary magnet. By means of the adjustment screw 53, I am able to vary the strength of the field which is the yieldingly resistive restoring force between the arbor magnet 35 and the pole extremities 48 and 49 of stationary magnet 50 to calibrate the instrument.

Except for the features particularly pointed out presently, the alternative type of meter shown in Figs. 9–13 is generally similar to the first described form, and accordingly in order to avoid repetition, all corresponding parts in the modification have been identified with the same numerals previously employed to which the letter "a" has been added in each instance for convenience of more ready distinction. To begin with, the modified instrument is designed for measurement of current flow in one direction only and is provided with a coil 36a which has several turns instead of a single coil as before. The important difference to be here noted is that a hair-spring 60 is here utilized to serve in lieu of the fixed magnet element 50 of the first embodiment to yieldingly resist the movement of the pointer 27a and to normally keep it in the zero position when the instrument is not in use, said spring being secured at one end to the arbor 28a and at the other end to one of the bracket projections 19a of the frame member 15a. Calibration of the instrument of Figs. 9–13 is effected by changing the magnetic strength of the arbor magnet 35a, for example, by subjecting it to a demagnetizing flux or by shifting the coil 36 in the direction of its magnetic axis so as to vary the effect of the flux of the coil upon said arbor magnet.

Having thus described my invention, I claim:
1. In an electric measuring instrument of the character described, an open coil for connection in an electric circuit which is to be metered; a movable magnet system including an arbor disposed adjacent one end of the coil with its axis intersecting that of the coil at right angles, a magnet fixed on the arbor transversely with a portion thereof extending into the hollow of the coil, and two transversely arranged magnet vanes on the arbor with portions thereof extending over the coil at opposite sides thereof; a stationary dial; an indicating pointer on the arbor for coordination with the dial; and means influential upon the arbor to restore the pointer to zero position on the dial upon interruption of current flow in the coil.

2. An electric instrument according to claim 1, wherein the arbor magnet and the magnetic vanes are all of discous configuration.

3. An electric measuring instrument according to claim 1, in which the restoring means is in the form of a stationary magnet arranged externally of the coil with its poles respectively positioned adjacent the opposite poles of the arbor magnet to react therewith.

4. An electric measuring instrument according to claim 1, in which the restoring means is in the form of a stationary magnet arranged externally of the coil with its poles respectively positioned adjacent to and adjustable toward and away from the opposite poles of the arbor magnet.

5. In an electric measuring instrument of the character described, an open coil for connection in an electric circuit which is to be metered; an arbor arranged adjacent one end of the coil with its axis intersecting that of the coil at right angles; a magnet fixed on the arbor transversely with a portion thereof extending into the hollow of the coil; a stationary dial; an indicating pointer on the arbor for coordination with the dial; and a stationary restoring magnet arranged externally of the coil with its poles respectively positioned adjacent to and adjustable toward and away from the opposite poles of the arbor magnet.

6. An electrical measuring instrument according to claim 5, wherein the restoring magnet is fashioned to U shaped configuration from springy strip metal with pole arms reaching to the plane of the arbor magnet and with an arched portion connecting said arms; and further including a stationary frame which affords a bearing for the arbor; and a headed screw having a shank which passes through the arched portion of the restoring magnet and engages into the frame and constitutes the adjusting means.

WILLIAM E. PFEFFER.

REFERENCES CITED

The following references are of record in the file of this patent:

UNITED STATES PATENTS

| Number | Name | Date |
| --- | --- | --- |
| 413,812 | Ritchie | Oct. 29, 1889 |
| 497,522 | Hoyt | May 16, 1893 |
| 582,120 | Franke | May 4, 1897 |
| 671,279 | Jameson | Apr. 2, 1901 |
| 1,220,587 | Beede | Mar. 27, 1917 |
| 1,761,908 | Eshbaugh | June 3, 1930 |
| 1,776,708 | St. Clair | Sept. 23, 1930 |
| 2,002,445 | Arey et al. | May 21, 1935 |
| 2,183,685 | Lingg | Dec. 19, 1939 |